US006113972A

United States Patent [19]
Corliss et al.

[11] Patent Number: 6,113,972
[45] Date of Patent: Sep. 5, 2000

[54] PHYTOSTEROL PROTEIN COMPLEX

[75] Inventors: Glenn Corliss, Mt. Prospect; John W. Finley, Hawthorne Woods; Hemendra N. Basu, Bartelt; Frank Kincs, Chicago; Lenora Howard, Mt. Prospect, all of Ill.

[73] Assignee: Monsanto Co., St. Louis, Mo.

[21] Appl. No.: 09/205,534

[22] Filed: Dec. 3, 1998

[51] Int. Cl.$^7$ .............................. A23D 9/007; A23L 1/29
[52] U.S. Cl. .................... 426/613; 426/601; 426/614; 426/656; 552/544
[58] Field of Search .................................. 426/601, 613, 426/614, 656; 552/544

[56] References Cited

U.S. PATENT DOCUMENTS

| | | | |
|---|---|---|---|
| 3,865,939 | 2/1975 | Jandacek | 424/238 |
| 3,881,005 | 4/1975 | Thakkar | 424/238 |
| 4,160,850 | 7/1979 | Hallstrom | 426/60 |
| 4,218,334 | 8/1980 | Lundmark | 252/356 |
| 4,391,732 | 7/1983 | Lundmark | 252/356 |
| 4,588,717 | 5/1986 | Mitchell | 514/170 |
| 4,705,875 | 11/1987 | Mitchell | 556/46 |
| 5,244,887 | 9/1993 | Straub | 426/541 |
| 5,502,045 | 3/1996 | Miettinen | 514/182 |
| 5,747,464 | 5/1998 | See | 514/26 |
| 5,843,499 | 12/1998 | Moreau | 426/611 |

FOREIGN PATENT DOCUMENTS

| | | |
|---|---|---|
| WO92/19640 | 11/1992 | WIPO . |
| WO95/00158 | 1/1995 | WIPO . |
| WO96/38047 | 12/1996 | WIPO . |
| WO98/06405 | 2/1998 | WIPO . |
| WO98/19556 | 5/1998 | WIPO . |

OTHER PUBLICATIONS

Webb 1970 Byproducts from Milk 2nd edition AVR Publishing Co, Inc. Westport CT p333–340.
Watt 1975 Composition of Foods USDA Agriculture Handbook No 8 p. 22.
Mattson 1982 Am. J. of Clinical Nutrition 35:697–700.
Ikeda 1988 J. of Lipid Research 29:1583–1591.
Kudchodkar 1976 Atheroschlerosis 23:239–248.
Ikeda 1988 J. of Lipid Research 29:1573–1582.
Vankanen 1992 Clinica Chimica Acta 205:97–107.
Ling 1995 Dietary Phytosterols Life Sciences 57(3)195–206.
Winton 1937 The Structure and Composition of Foods vol. III John Wiley & Sons, Inc London p 175–179.
Kuksis, Arnis, The Absorption of cholesterol and plant sterols by intestine. Fat Absorption II. CRC Press, Inc. Boca Raton, Florida, p. 2. (1987).
Powrie, W.D. and Nakai, S., Characteristics of Edible Fluids of Animal Origin. "Food Chemistry." Ed. Fennema, O. p. 833.
Kudchodkar, B.J. Horlick, L., Sodhi, Hl. S., Effects of plant sterols on cholesterol metabolism in man. Atherosclerosis. 23. 239. (1976).
Heinemann, T., Leiss, O., Von Bergmann, K., Effect of low–does sitostanol on serum cholesterol in patient with hypercholesterolemia, Atherosclerosis, 61, 219–223, (1986).
INFORM, "Corn Fiber Yields Cholesterol–Lowering Oil", vol. 8, No. 11 (Nov., 1997).

*Primary Examiner*—Carolyn Paden
*Attorney, Agent, or Firm*—Patrick Wooley; Veo Peoples, Jr.; Haverstock, Garrett & Roberts

[57] ABSTRACT

The present invention relates to phytosterol protein complex which is comprised of an amount of phytosterol, an amount of protein, and an amount of edible oil, with the phytosterol protein complex designed to increase the bioavailability of the phytosterol, so that if consumed on a regular basis hopefully cholesterol levels will be lowered in the subject consuming the phytosterol protein complex. The present invention also relates to methods for forming the phytosterol protein complex, methods for potentially lowering cholesterol in humans, and methods for forming food products made from the phytosterol protein complex.

24 Claims, No Drawings

PHYTOSTEROL PROTEIN COMPLEX

FIELD OF THE INVENTION

The present invention relates to a phytosterol protein complex and methods for forming such complex, as well as, foods containing the phytosterol protein complex. Additionally, the present invention relates to delivering phytosterols to a human, with the intent of lowering cholesterol levels in the human.

BACKGROUND OF THE INVENTION

High levels of serum cholesterol and low density lipoproteins in humans are known to pose serious potential health risks, included among the risks are heart disease, atherosclerosis, high blood pressure, and other cardiovascular maladies. Atherosclerosis patients generally exhibit concomitant hypercholesterolimia. (See Kuksis, 1987). The typical American diet exacerbates the problem because it is high in cholesterol, a dietary lipid that can cause synthesis of high levels of cholesterol by humans. Because of the risk factors associated with hypercholesterolemies, the American Heart Association™ recommends a diet which is designed to lower serum cholesterol and low density lipoprotein levels in humans. Such a diet typically includes fruits, vegetables, and grains, and reducing the intake of foods like red meat, eggs, and foods which have been fried or are high in cholesterol and fat. Unfortunately, it has been observed that consumers, especially in the United States of America, generally prefer diets which are high in saturated fats. Conversely, diets rich in fruits, vegetables, and grains which contribute to the lowering of serum cholesterol levels appear to be less desirable to consumers. It has further been observed that consumers generally prefer fatty foods, because of the mouth feel, texture, and flavors associated with foods containing high levels of fat. This particular eating pattern contributes to the increase in serum cholesterol levels. As such, it is desired to have food products which taste like they have high levels of fat, but which are healthy and do not have the negative health characteristics associated with foods containing large amounts of fat. It is also desired to have food products which contain healthful ingredients to counter the intake of large amounts of fat.

Many food products such as baked pastry products, egg noodles and pastas, mayonnaise, salad dressing, custard, ice cream and other frozen desserts, granola bars and other health food bars, spreads, soups, and health drink beverages contain some quantity of egg or other food protein, such as whey or soy isolate. The egg is typically added to the food product to emulsify lipids, and enhance flavor and texture, as well as, to enhance the protein content of a particular food. It is known that eggs are high in protein, triglycerides, and cholesterol, so that often products made from eggs are high in fat and dietary cholesterol. Specifically, eggs are high in lipids, such as triglycerides, which constitute about 10.5% to 11.8% by weight of the egg, and cholesterol which equals about 6.2% of the total lipids in the egg. (See Powrie, Nakai). As such, it is desired to have an egg product which retains the high protein levels typically associated with eggs, but which does not contain high amounts of triglycerides and/or cholesterol.

Phytosterols, which include sterols, stanols, esters of stanols, esters of sterols, and combinations thereof lower serum cholesterol and low density lipoprotein cholesterol levels in humans when taken on a regular basis and in a sufficient amount. (See Kudchodkar, 1976). The efficacy of phytosterols was documented in INFORM, Vol. 8, no. 11 (November 1997), in an article entitled "Corn fiber yields cholesterol-lowering oil." Although phytosterols are abundant in plants such as corn, rice, and soybean and non-edible plants such as pine wood, the phytosterols are removed from the oil as a result of refining and are not consumed. Therefore, typical foods in the human diet generally do not contain sufficient amounts of phytosterols to effectively contribute to reducing cholesterol absorption.

The amount of phytosterols found in a typical healthy diet ranges from about 100 mg/day to about 300 mg/day. The phytosterols can be derived from corn bran and other plant materials described above. Generally, an amount of phytosterols equal to from about 0.5 to about 4.0 grams per day is necessary to lower cholesterol levels in humans. (See Heinemann, 1986). But, as mentioned, very few foods, natural or otherwise, are high in phytosterols. In order to obtain an adequate amount of phytosterols required to lower cholesterol levels the diet must be supplemented. Thus, it is desired to have means for delivering sufficient amounts of phytosterols to humans so as to hopefully lower cholesterol levels. Unfortunately, delivery of phytosterols to a human may not be enough to ensure the potential lowering of cholesterol levels. Even if phytosterols are included as part of a person's diet, benefits realized from consuming such phytosterols may not be realized. In some forms, such as crystals, phytosterols are not made readily available to the gastrointestinal tract. When phytosterols are consumed they must be in a form where they are delivered in an emulsion to the gut wall where they are bound to sites in the gastrointestinal tract. When this binding occurs the benefits associated with consuming the phytosterols is realized.

Phytosterols lower cholesterol by binding to sites in the gastrointestinal tract and competing with cholesterol for binding sites, thus inhibiting the absorption of cholesterol. Plant sterols have structures that are similar to cholesterol. Because of the structural similarities to cholesterol, plant sterols are capable of inhibiting cholesterol absorption. While phytosterols can bind to receptor sites to prevent cholesterol absorption, it is known, as mentioned, that phytosterols do not readily bind to the gastrointestinal tract as the biological availability of the phytosterols is low. In other words, often it is difficult for a human to adequately use a concentration of the phytosterols so that benefits associated with consumption of the phytosterols, such as lower serum cholesterol levels, can be realized. As such, it is desired to have a method or composition for increasing the bioavailability of the phytosterols so that they can be more readily bound to sites on the gastrointestinal tract of a human. It is especially desired to have a composition for increasing the bioavailability of the phytosterols which has added benefits, such as the delivery of protein.

SUMMARY OF THE INVENTION

The present invention relates to a phytosterol protein complex which delivers phytosterols and which increases the bioavailability of phytosterols by delivering the phytosterols as a phytosterol protein complex. The phytosterol protein complex is comprised of an amount of a phytosterol constituent equal to from about 5% to about 80% by weight of the phytosterol protein complex, an amount of a protein constituent equal to from about 20% to about 90% by weight of the phytosterol protein complex, and an amount of edible oil equal to from about 5% to about 20% by weight of the phytosterol protein complex. Additional constituents can be added to the phytosterol protein complex, however, it is required that the phytosterol protein complex contain the protein, phytosterol, and edible oil constituents.

The phytosterol can be selected from the group consisting of sterols, stanols, esters of sterols, esters of stanols, and combinations thereof, with the phytosterols selected importantly having a molecular structure similar to a cholesterol molecule. In fact, the backbone of the phytosterol is similar to the backbone of the cholesterol, with the phytosterol molecule having a structure similar to the cholesterol molecule. The similarity in structure between the molecules means that the phytosterol and cholesterol molecules compete for the same binding sites in the gastrointestinal tract. If the phytosterol binds to a site first, then the cholesterol can not bind to that site and, as such, the cholesterol will not be absorbed into the body. In essence, it is believed that the phytosterol blocks absorption of cholesterol. Preferably, the phytosterol added to the phytosterol protein complex will be in a purified form, with enough phytosterol added to ensure that 0.1 grams, more preferably 0.3 grams, of phytosterol are delivered per serving of food item containing the phytosterol protein complex.

The protein can be selected from a wide variety of sources so long as the protein has less than 55% by weight triglycerides. Additionally, the protein should preferably contain an amount of phospholipids. Most importantly, the protein selected should function as a carrier to increase the bioavailability of the phytosterol.

The edible oil should not be heat sensitive, as the edible oil is used to dissolve the phytosterols so that the crystalline structure of the phytosterols is eliminated. Typically, temperatures of at least 60° C. are required to solubilize the phytosterols, as such the edible oil should not smoke or break down at temperatures of equal to or less than 60° C. Further, the edible oil should help bind the phytosterol to the protein.

The present invention also relates to methods for forming the phytosterol protein complex. The methods include dissolving a purified amount of a phytosterol constituent in an amount of edible oil heated to a temperature of at least 60° C. An amount of protein is obtained and then mixed with the phytosterol edible oil mixture to form the phytosterol protein complex. The phytosterol protein complex is then ready to be used, or it can be dried to form a phytosterol protein powder.

Food products can also be formed under the present invention, with the phytosterol protein complex added to a food product at any time prior to consumption. Specifically, the phytosterol protein complex can be substituted for protein ingredients during formation of the food products, with the phytosterol protein complex preferably substituted in a 1:1 ratio either by weight or volume. Instead of substituting the phytosterol protein complex for protein ingredients, the phytosterol protein complex can be simply added as an additional ingredient during the formation of the food product. Further, the phytosterol protein complex does not have to be included as an ingredient in a food product, instead the phytosterol protein complex can be added to any food product just prior to consumption so that the addition of the phytosterol protein complex is similar to a person adding salt to his or her food. Food products include both solid and liquid products consumed by humans.

Finally, the present invention relates to a method believed to be useful in reducing serum cholesterol and low density lipoprotein levels in humans. The method involves forming the phytosterol protein complex and then adding the phytosterol protein complex to food products. The food products containing the phytosterol protein complex should be then consumed on a daily basis. Enough phytosterol should be present in the food product to ensure that at least 0.1 grams, and more preferably 0.3 grams, of phytosterol are delivered per serving of food product.

This invention is desirable because it provides for a food supplement that delivers protein to a human consumer and, more importantly, an amount of phytosterols to a subject. The delivery of phytosterols is desired because they are believed to help lower cholesterol levels in humans. Also, this invention is desired because it is believed that the present invention makes the phytosterols more bioavailable. Increased bioavailability means the phytosterols will essentially work better in the human subject and consequently the results associated with phytosterol consumption will be more easily realized. This invention also provides for an easy way to deliver phytosterols to humans.

DETAILED DESCRIPTION OF THE INVENTION

The present invention relates to a phytosterol protein complex which is designed to deliver phytosterols and increase the bioavailability of phytosterols. Beneficially, the phytosterol protein complex will, in addition to delivering phytosterols, deliver an amount of protein to the subject consuming the phytosterol protein complex. Additionally, the present invention relates to methods for forming the phytosterol protein complex, methods for forming food products which contain an amount of the phytosterol protein complex, and a method for potentially lowering cholesterol and low density lipoproteins.

The phytosterol protein complex is comprised of at least three constituents, which include an amount of a phytosterol constituent, a protein constituent, and an edible oil constituent. The amounts of the three constituents in the phytosterol protein complex can vary, with the amounts dependent upon ensuring that a sufficient amount of available phytosterol is delivered when consumed by a person.

The phytosterol constituent is present in the phytosterol protein complex in an amount equal to between about 5% and about 80% by weight of the phytosterol protein complex, with the phytosterol constituent selected from the group consisting of sterols, stanols, esters of sterols, esters of stanols, and combinations thereof. More specifically, the phytosterol constituent can be selected from the group consisting of beta-sitosterol, beta-sitostanol, sitostanyl oleoyl ester, sitostanyl ferulate ester, stigmosterol, avenosterol, and combinations thereof. Any phytosterol can be used which competes with a cholesterol molecule for a binding site in the gastrointestinal tract. A more preferred amount of phytosterol in the phytosterol protein complex is equal to between about 5% and about 50% by weight of the phytosterol protein complex. More preferably, an amount of phytosterol in the phytosterol protein complex is equal to between about 10% and about 15% by weight of the phytosterol protein complex. Phytosterols can be derived from any of a variety of plant materials, including corn fiber oil, with the phytosterols removed using known extraction techniques such as molecular distillation, selective crystallization (winterization), intraesterification to produce ethyl methyl esters of fatty acids followed by fractured distillation, and chromatography. In particular, phytosterols can be extracted from pine wood, and food such as corn, canola, corn fiber, cotton seed, palm kernel, sunflower seed, rice bran, sesame, soybeans, and safflower. It is most preferred to extract the phytosterols from corn fiber oil.

Preferably, when the phytosterol constituent is added to the phytosterol protein complex, the phytosterol constituent is a pure phytosterol extract which does not contain additives or other constituents, so that the phytosterol added to the protein phytosterol complex will be in an unadulterated form. In particular, it is preferred if the phytosterol constituent does not include triglycerides or other fatty acids. Regardless of whether the phytosterol is mixed with an additive, it is necessary for the phytosterol to be present in the phytosterol protein complex in an amount sufficient to deliver at least 0.1 grams, and more preferably 0.3 grams, of phytosterol per serving of food product made from the phytosterol protein complex. The amount of phytosterols delivered should range between about 0.1 gm and about 4.0 gm of phytosterols per serving of food product.

The phytosterol protein complex includes an amount of a protein constituent equal to between about 20% and about 90% by weight of the phytosterol protein complex. More preferably the protein constituent is present in an amount equal to between about 70% and about 85% by weight of the phytosterol protein complex. The protein constituent can be selected from the group consisting of caesin, egg yolk, gluten, zein, soy protein, whole egg, whey protein, skim milk powder, egg white, and combinations thereof. The most preferred protein constituents for use in the protein phytosterol complex are proteins which include an amount of phospholipids. Most preferably the protein constituent is derived from whole egg that has been treated so that it is defatted. The whole egg is preferred because it contains phospholipids which readily bind to the phytosterol. Also, it appears that the whole egg binds to the phytosterol so that the phytosterol appears to replace the triglycerides that were removed from the whole egg. The binding of the phytosterol to the whole egg appears to make the phytosterols more bioavailable. Regardless of the specific protein constituents used, the most preferred protein constituents for use in the phytosterol protein complex are protein constituents which include an amount of phospholipids and which make the phytosterol more bioavailable. As such, the particular protein chosen should preferably contain phospholipids and have an amount of triglycerides equal to less than 55% by weight of the total amount of protein added to the phytosterol protein complex. An example of a particular egg yolk protein which is desirable for use in the present invention is the Eggcellent® 8550 product manufactured by Monsanto Company®, St. Louis, Mo. Eggcellent® 8550 contains 74% less fat and 90% less cholesterol than whole egg yolk when reconstituted on an equal protein basis. The Eggcellent® 8550 product retains the protein-phosholipids complex, therefore, the protein is suitable for forming a protein-lipid interaction or emulsion. It is believed that the protein attaches to the phytosterol, encapsulates the phytosterol, and allows the phytosterol to be more bioavailable for delivery to the gastrointestinal tract of a human subject. More particularly, the egg protein and the phytosterol interact to form an emulsion, in which the egg protein encapsulates the phytosterol. Essentially, the protein is a carrier for the phytosterol.

The phytosterol protein complex additionally includes an amount of an edible oil constituent equal to between about 5% and about 20% by weight of the phytosterol protein complex. More preferably, the phytosterol protein complex includes an amount of edible oil equal to between about 5% and about 10% by weight of the phytosterol protein complex. Any edible oil may be used in the present phytosterol complex; however, it is most preferred to use an edible oil that readily binds to the phytosterols. The edible oil is added to the phytosterol protein complex because the edible oil will help bind the phytosterol constituent to the protein constituent and the edible oil is used to solubilize crystalline phytosterols. It is important that the edible oil selected is not heat sensitive, as it generally takes a minimum temperature of 60° C. to dissolve the phytosterols into solution. Also, enough edible oil should be mixed with the phytosterols to ensure that the phytosterols go into solution. Phytosterols which do not dissolve in solution maintain a crystalline structure and the crystalline form of the phytosterols does not readily bind to the gastrointestinal tract, meaning it lacks bioavailability. As a result, it is imperative that the phytosterol be dissolved and solubilized, and the edible oil provides an ideal composition for dissolving the phytosterol constituent. Among the heat tolerant oils suitable for use are rice bran oil, sesame oil, peanut oil, and other heat tolerant oils. While not preferred, fats, fat replacers, animal oils, and combinations thereof can also be used as the edible oil constituent.

Additionally, the phytosterol protein complex can include an amount of glycerides equal to between about 0% and about 10% by weight of the protein. The glycerides are added because they function as an emulsifier. The phytosterol protein complex can also include an amount of lecithin equal to between about 0% and about 10% by weight of the protein. The lecithin also functions as an emulsifier. Further, the phytosterol protein complex can include an amount of phospholipids equal to between about 0% and about 10% by weight of the protein, these also function as emulsifiers. One other composition that can be added to the phytosterol protein complex is a starch constituent in an amount equal to about 10% by weight of the phytosterol protein complex. The starch constituent will in essence encapsulate and preserve the phytosterol protein complex. The starch constituent performs the function of a coating.

The method for forming the phytosterol protein complex includes the steps of mixing an amount of phytosterol with an amount of edible oil. Because the phytosterol constituent is typically crystalline, the edible oil should be heated to a temperature of at least 60° C. This temperature will cause the phytosterol to go into solution and will result in the crystalline structure of the phytosterol being eliminated. The oil to phytosterol ratio will range between about 1 part and about 10 parts of oil to 1 part of phytosterol, with the parts preferably measured by weight. Preferably, the oil to phytosterol ratio is equal to about 5 parts oil to about 1 part phytosterol. Once the phytosterol has been added to the heated edible oil, the two constituents are mixed so as to ensure that the phytosterol dissolves in the edible oil.

After the phytosterol is dissolved in the edible oil, an amount of protein is obtained. A commercial protein product can be purchased or an amount of protein can be extracted from a protein source and combined with the edible oil and phytosterol mixture. Again the most preferred protein for use is defatted whole egg. An example of a way to extract an amount of protein suitable for use with the phytosterol is to extract fresh egg yolks with ethanol and isopropanol so as to separate the cholesterol and triglycerides from the remainder of the egg yolk. The ethanol is used to extract cholesterol and the isopropanol is used to extract the triglycerides from the egg yolk. The solvents, ethanol and isopropanol, can then be separated from the egg yolk by filtering the solution and drying under a vacuum at ambient temperature. The defatted egg yolk protein can then be combined with egg white protein. The defatted egg yolk is then dried to form a dehydrated egg yolk powder which is suitable for mixing with the phytosterol edible oil mixture. Additionally, the egg yolk can be extracted with acetone instead of ethanol and isopropanol. Beneficially, the protein or egg yolk will increase the bioavailability of the phytosterol and deliver an amount of protein.

Once the protein constituent has been obtained, it is then added to the phytosterol edible oil mixture. The protein constituent is preferably added in an amount to equal a 10:1 by weight ratio with the edible oil phytosterol complex so that there is ten parts by weight protein to one part by weight of phytosterol edible oil complex. The two constituents are then mixed so as to thoroughly disperse the constituents and form the phytosterol protein complex. Shear force and vacuum are applied to the mixture to thoroughly disperse the constituents. Once the phytosterol protein complex has been formed it can be dried to form a phytosterol protein complex powder. The dried phytosterol protein complex can contain up to 50% by weight phytosterols.

The phytosterol protein complex can be added to food products, especially those which require an amount of egg as an ingredient. Typically, any protein ingredient can be replaced with the phytosterol protein complex. The phytosterol protein complex, when it is made from a whole egg, can be substituted for egg products normally placed in food products. The phytosterol protein complex will preferably replace the egg in a 1:1 ratio. It should be noted that the phytosterol protein complex does not have to replace an egg product or protein, instead it can be mixed as an additional ingredient in a food product. If the phytosterol protein complex is added as an additional ingredient to a food product it should not adversely affect the taste of the food product. Examples of food applications where the phytosterol protein complex can be used as an ingredient include, baked pastry products, egg noodles and pastas, mayonnaise, salad dressings, custard, ice cream, other frozen desserts, granola bars, other health food bars, spreads, soups and healthy drink beverages.

The phytosterol protein complex can be placed on any of a variety of foods, so that the benefits associated with the phytosterol protein complex can be realized without having to form foods which include the phytosterol protein complex as an ingredient used to form the food product. For example, the phytosterol protein complex powder can be sprinkled on top of a pizza prior to consumption or mixed in with a liquid beverage. Beneficially, the phytosterol protein complex can be incorporated into a food product when it is manufactured or can be made into a separate composition which is mixed with a food product by a consumer prior to consumption.

The following examples are for illustration purposes only and are not meant to limit the claims in any way.

EXAMPLES

Example 1 is submitted for comparative purposes only.
Example 1
Fresh egg yolks were extracted with ethanol and isopropanol to remove lipids and triglycerides from the egg yolks. More specifically, this was done to form a defatted egg.

An amount of protein, egg yolk, equal to 50.8 grams (gm) and having a pH of 6.44 was mixed with 300.0 milliliters (ml) of ethanol having a pH of 6.62. The eggs were purchased at a local supermarket and the ethanol was manufactured by AAper alcohol & chemical, located in Shelbyville, Ky., lot# 97EO8UA, and had product number 97EO8UA. The egg yolk and ethanol were allowed to stir in a beaker for one (1) hour at 55° C. The ethanol was then separated from the egg yolk by passing the mixture through a Whatman #1 filter paper and a Bücher funnel with a vacuum. The protein was then extracted a second time by mixing the protein with 300.0 ml of isopropanol manufactured by Burdick Jackson, Muskegon, Mich., and sold under lot# BP 93. The extraction was performed at a temperature of 55° C. and allowed to stir for one (1) hour. The isopropanol was then filtered away from the protein the same as the ethanol. The isopropanol extraction was then repeated. The egg yolk was then washed with ethanol, and removed by filtration the same as above.

Following-extraction, the protein was dried under vacuum using a rotovapor, manufactured by Büchi and having serial number R121 185062047. After drying, a dried protein, specifically a defatted egg yolk, was formed.

An amount of crystalline phytosterol was dissolved in a hot ethanol solution having a temperature of 60° C. so that the phytosterols were no longer crystalline. The hot ethanol solution containing the phytosterols was comprised of a mixture of ethanol and phytosterols in a 30:1 by weight mixture. After dissolving the phytosterols, the phytosterol ethanol solution was then allowed to cool to room temperature (25° C.). At room temperature some of the phytosterols recrystallized.

An amount of the defatted egg yolk powder, 100.0 gm was dissolved in 600.0 ml of water with the egg yolk dissolved in the water by mixing the egg yolk and water together for 30 minutes, the two constituents were mixed by a stir bar and a stir plate at 25° C. Then the phytosterol ethanol solution, at room temperature, was added slowly to the defatted egg yolk and stirred for an additional 5 minutes. The mixture was then homogenized in a Stephan Vertical Cutter Mixer manufactured by Stephan Machinery Corporation, Columbus, Ohio under a vacuum, at a speed of 1500 rpms, for 30 minutes, and at ambient temperature. The egg yolk phytosterol mixture was then dried in a vacuum drum dryer made by Buflovok of Buffalo, N.Y. The protein phytosterol complex was pumped on to the drum using a Easy-Load pump (model 7518-10) manufactured by Masterflex and the pump had a flow rate ranging between 95 and 100 ml per minute. The drum dryer had a pump setting ranging between 0.60 and 0.70, a tubing size of 17 inches, under a vacuum pressure of 17 torr, and a steam pressure of 4 to 5 psi. The samples were continuously fed into the drum dryer, so that as the samples dried they tumbled into a collector in the drum dryer and flakes were formed. The flakes were then crushed into a powder.

It was found that the egg yolk phytosterol powder formed was generally unacceptable. When the ethanol phytosterol solution was allowed to cool to room temperature the phytosterols recrystallized. This was an undesirable result and it was found that an alcohol was generally unsuitable for dissolving the phytosterols.

Examples 2, 3, and 4 were performed so as to develop a method and composition for increasing the bioavailability of the phytosterols for humans. As such, the experiments compared three different compositions, a control, a mixture of lauric oil and phytosterol stanols, and a mixture of lecithin, lauric oil, and stanols.
Example 2
The control composition involved mixing an amount of protein, Eggcellent® manufactured by Monsanto® and having product number 8550 which is a defatted egg yolk that is 74% fat free and 90% cholesterol free, with an amount of oil. The protein was added to a 1000 milliliter beaker at room temperature in an amount equal to 100.0 grams. An amount of distilled water equal to 600.0 milliliters was then added to the protein in the beaker and the protein and water were stirred together for ten (10) minutes by a magnetic stir bar and stir plate.

Laurical™, lauric oil, manufactured by Monsanto® under manufacturing No. CYER2526, was added in an amount equal to 25.2 grams to the protein water mixture to form an oil protein mixture. The oil protein mixture was then mixed in a Stephan Vertical Cutter Mixer manufactured by Stephan Machinery Corporation, Columbus, Ohio and under a high vacuum at a speed of 1500 rpms for 30 minutes at ambient temperatures. After the oil protein mixture was mixed, the pH was adjusted from about 6.35 to approximately 6.0 by adding a citric acid crystal in an amount equal to about 0.36 grams. The citric acid crystal was manufactured by Hoorman Reimer Corporation and had product lot# J11B40511K. After the addition of the citric acid crystal, the sample was stored in a refrigerator overnight at a temperature of 4° C. The following day the sample was removed from the refrigerator and placed in a Stephan Vertical Cutter Mixer and allowed to mix for 30 minutes using the same condition stated above. The sample was then removed from the Stephan mixer and dried in the vacuum drum dryer using the same conditions stated in Example 1. Upon conclusion of drying, the sample was a yellow flake. The flake was crushed to form a yellow powder. It was found that the sample was desirable because the phytosterol did not recrystallize.

Example 3

A sample was prepared the same as in Example 2, except that when the lauric oil was added to the protein water mixture an amount of phytosterol stanol equal to 10.0 grams was also added to the protein water mixture. The stanol had been heated in the lauric oil in a separate beaker until the stanol had dissolved, with the stanol dissolving at a temperature of approximately 60° C. The phytosterol oil mixture was then cooled to room temperature (25° C.) and then added to the protein water mixture. The mixture of water, protein, lauric oil, and stanol was then transferred to a Stephans Vertical Cutter Mixer and mixed under vacuum the same as in Example 2. The pH was then adjusted from about 6.35 to about 6.0 the same as above and the sample was stored overnight in a refrigerator at 4° C. The following day the sample was removed from the refrigerator and placed in a Stephan Vertical Cutter Mixer and allowed to mix for 30 minutes using the same condition stated in Example 1. The sample was then removed from the Stephen Vertical Cutter Mixer and dried in the vacuum drum dryer using the same conditions stated in Example 1. Upon conclusion of drying, the sample was a yellow flake. The flake was crushed to form a yellow powder. It was found that the sample was desirable because the phytosterol did not recrystallize.

Example 4

A lecithin, protein, water, lauric oil composition was formed the same as in Example 2, with the lecithin added simultaneously with the lauric oil to the protein water mixture. The lecithin was added in an amount equal to 20.0 grams to the lauric oil and was manufactured by Central Soya, Fort Wayne, Ind., and had lot# 97325308. The lauric oil was present in an amount equal to 15.0 grams. Before the addition of the lecithin to the lauric oil an amount of stanol was added to the lauric oil, with the amount of stanol added equal to 10.0 grams. The lauric oil had been heated to a temperature of 60° C. on a hot plate prior to the addition of the stanol to ensure that the stanol would solubilize in the oil. The stanol was the same as the stanol mentioned above and was added in the same way as mentioned above. The solution of stanol, lecithin, and lauric oil was allowed to cool to room temperature (25° C.) prior to adding it to the protein water mixture. The mixture was then transferred to a Stephans Vertical Cutter Mixer the same as above and mixed under vacuum at a high speed the same as in Example 2. The pH was also adjusted the same as in Example 2 with the finished solution stored in a refrigerator overnight at a temperature of 4° C. The following day the sample was removed from the refrigerator and placed in a Stephan Vertical Mixer and allowed to mix for 30 minutes using the same condition stated in Example 1. The sample was then removed from the Stephan Mixer and dried in the vacuum drum dryer using the same conditions stated in Example 1. Upon conclusion of drying, the sample was a yellow flake. The flake was crushed to form a yellow powder. It was found that the sample was desirable because the stanols did not recrystallize.

Example 5

Nabisco Brand Eggbeaters® (lot# 9325308), Nabisco is located in New Jersey, composed of 99% egg whites were purchase from a local supermarket. Eggbeaters® in an amount equal to 976.0 grams were poured into a 1000 ml beaker.

Rice Bran Oil, manufactured by Select Origin, Mansfield, Ohio, in an amount equal to 43.2 gm was heated in a beaker to 60° C. on a hot plate. Stanol, a phytosterol derived from soybeans, was added to the rice bran oil in an amount equal to 4.8 gm. The stanol was allowed to dissolve in the rice bran oil. The oil and stanol mixture was then cooled to 25° C. The Soy lecithin in an amount equal to 4.8 g was mixed with the stanol oil mixture. The Soy Lecithin, lot # 97325308, was manufactured by Central Soya located in Fort Wayne, Ind. Then the lecithin stanol oil mixture was added to the Eggbeater® solution in the beaker. The pH of the Eggbeaters™ and stanol mixture was 8.35. The mixture was then poured into a Stephan Vertical Cutter Mixer, manufactured by Stephan Machinery, Columbus, Ohio, and allowed to mix for 15 minutes at a speed of 1500 rotations per minute under vacuum of ambient temperatures. Upon conclusion of mixing the Eggbeater™ oil sample was a smooth white liquid. The sample was stored in the refrigerator for 1 week and then observed to determine if the stanols had recrystallized. The product was desirable because the stanols did not recrystallize.

Example 6

Eggcellent® 8550 manufactured by Monsanto® St. Louis, Mo., is a low fat, low cholesterol dried egg yolk which is 74% fat free and 90% cholesterol free when reconstituted on an equal protein basis and compared to whole egg yolks. The Eggcellent® 8550 in the amount of 100.0 gm was dissolved in 600.0 ml of de-ionized distilled water in a 1,000 ml beaker. The mixture was stirred for 10 minutes using a magnetic stir bar and stir plate. The pH of the mixture was 6.35. In a separate beaker, rice bran oil, manufactured by Select Origin, located in Mansfield, Ohio, in the amount of 21.0 gm was heated to 60° C. on a hot plate. Stanol, a phytosterol derived from soybeans, in the amount of 2.0 gm was added to the hot oil and allowed to heat at 60° C. until the stanols dissolved. The oil and stanol mixture was then cooled to 25° C. and the mixture was added to the Eggcellent® solution. The pH of the Eggcellent® and stanol mixture was 6.10. The mixture was poured into a Stephan Vertical Cutter Mixer (manufactured by Stephan Machinery, Columbus, Ohio) and allowed to mix for 30 minutes at a speed of 1500 rotation per minute under vacuum and at ambient temperatures. The pH was then adjusted from approximately 6.10 to approximately 6.00 using citric acid. The sample was stored in the refrigerator for 1 week and then observed to determine if the stanols had recrystallized. The product was desirable because the stanols did not recrystallize.

Example 7

The compositions formed in Examples 2–6 were then analyzed to ensure that the phytosterols or stanols, as well as, the lipids had been integrated into the protein lipid complex. The amount of stanol and lipid recovered by this test should equal the amount of stanol and lipid added to the protein lipid complex. This ensures that the lipids and stanols actually formed a composition with the protein constituent. This was also done to ensure that the compositions had a sufficient amount of phytosterols and lipids.

A solvent mixture composed of 200 ml of hexane, lot# 963048, manufactured by Fisher Scientific located in Fair Lawn, N. J., and 40 ml petroleum ether, lot#5167m23E38, manufactured by Mallincrodt Baker located in Pair, Ky., was added to a 500 ml flat bottom flask connected to a reflux and condenser apparatus. Each of the dry protein complex samples, from examples 2, 3, and 4, in the amount of 5 gm were placed into a separate thimble. Each of the liquid samples, from Examples 5 and 6, in the amount of 50 gm were placed into a separate thimble. The thimbles were placed in the reflux apparatus. The dry samples were allowed to reflux for 2 hours, and the liquid samples were allowed to reflux for 15 hours. The solvent was removed under vacuum using a Buichi Rotovapor model R-114. The samples were then diluted to volume with hexane (sample 2, 80 ml; sample 3, 85 ml; sample 4, 86 ml, sample 5, 15 ml; sample 6, 15 ml). The stanol concentration was then measured using a Hewlett Packard®6890 Gas Chromatography System with a FID and a Hewlett Packard® 5-MS columns (30m×0.25mm×0.25mm film thickness).

Acetone was used to extract the lipids and stanol from the protein-lipid complexes of Examples 2, 3, and 4. The extraction was done at room temperature. Dry mixtures from Examples 2, 3, and 4 in an amount equal to 3 grams and liquid mixtures from Examples 5 and 6 in an amount equal to 5 grams were extracted with 150 ml of acetone. This extraction was done for all of the above examples.

| | Theoretical Amount of Stanol (gm/ 5.0 g) | Actual Amount of Stanol (gm/ 5.0 gm) | % Stanol Recovered |
|---|---|---|---|
| Sample 2: protein + laurical ™ | 0.00 | 0.00 | 0 |
| Sample 3: protein + laurical ™ + stanol | 0.37 | 0.307 | 99.94 |
| Sample 4: protein + laurical ™ + lecithin + stanol | 0.37 | 0.303 | 99.93 |
| Sample 5: protein + rice bran oil + stanol | 0.3 | 0.25 | 83.33 |
| Sample 6: protein + rice bran oil + lecithin + stanol | 0.49 | 0.41 | 86.67 |

As can be seen, the use of an oil to dissolve the stanol worked and stanol or phytosterols were present phytosterol protein complex. Specifically, this test shows that greater than 80% of the stanols were present in the various samples.

The protein phytosterol complex can be added to foods at various levels to deliver a predetermined dose of phytosterol.

Thus, there has been shown and described novel phytosterol protein complex products and methods for making and using such products which fulfill all of the objects and advantages sought therefor. It will be apparent to those skilled in the art, however, that many changes, variations, modifications, and other uses and applications for the subject methods and compositions are possible, and also changes, variations, modifications, and other uses and applications which do not depart from the spirit and scope of the invention are deemed to be covered by the invention which is limited only by the claims which follow.

What is claimed is:

1. A phytosterol protein complex for increasing the bioavailability of a phytosterol constituent so as to deliver said phytosterol constituent to a human, wherein said phytosterol protein complex is comprised of:

a) an amount of said phytosterol equal to between about 5% and about 80% by weight of said phytosterol protein complex;

b) an amount of protein equal to between about 20% and 90% by weight of said phytosterol protein complex; and c) an amount of edible oil equal to between about 5% and 20% by weight of said phytosterol protein complex.

2. The phytosterol protein complex of claim 1 wherein said phytosterol is selected from the group consisting of beta-sitosterol, beta-sitostanol, sitostanyl oleoyl ester, sitostanyl ferulate ester, stigmosterol, avenosterol, and combinations thereof.

3. The phytosterol protein complex of claim 1 wherein said protein is selected from the group consisting of casein, egg yolk, gluten, zein, soy protein, whole egg, whey protein, skim milk powder, egg white, and combinations thereof.

4. The phytosterol protein complex of claim 1, wherein said protein is any protein that binds lipids and which has an amount of triglycerides less than 55% by weight of said protein.

5. The phytosterol protein complex of claim 1, wherein said phytosterol protein complex includes an amount of lecithin equal to between about 0% and about 10% by weight of said protein.

6. The phytosterol protein complex of claim 1 wherein said phytosterol protein complex includes an amount of glycerides equal to between about 0% and about 10% by weight of said protein.

7. The phytosterol protein complex of claim 1 wherein said phytosterol protein complex includes an amount of phospholipids equal to between about 0% and about 10% by weight of said protein.

8. The phytosterol protein complex of claim 1 wherein said phytosterol added to said protein is present in an amount of edible oil so that said edible oil contains an amount of phytosterol equal to at least 45% by weight of said edible oil.

9. The phytosterol protein complex of claim 8 wherein said edible oil does not breakdown at a temperature of less than 60° C.

10. The phytosterol protein complex of claim 1 wherein said phytosterol is preferably added in an amount equal to between about 5% and about 50% by weight of said phytosterol protein complex.

11. The phytosterol protein complex of claim 10 wherein said phytosterol is more preferably added in an amount equal to between about 10% and about 15% by weight of said phytosterol protein complex.

12. The phytosterol protein complex of claim 1 wherein said edible oil is preferably added in an amount equal to between about 5% and about 10% by weight of said phytosterol protein complex.

13. A method for forming a phytosterol protein complex designed to increase the bioavailability of a phytosterol, wherein said method comprises:

a) obtaining an amount of protein so that said protein contains an amount of triglycerides equal to less than 55% by weight of said protein;

b) obtaining an amount of phytosterol;

c) dissolving an amount of said phytosterol in an edible oil, so that said phytosterol protein complex will contain at least 0.1 grams of phytosterol per serving of food product containing said phytosterol protein complex, to form a phytosterol edible oil complex, with said phytosterol dissolving so that said phytosterol no longer maintains a crystalline structure; and, d) adding said protein to said phytosterol edible oil complex to form a phytosterol protein solution.

14. A method for delivering phytosterol to a human in a sufficient concentration to lower serum cholesterol and low density lipoprotein levels in the human, wherein said method comprises:

a) forming a phytosterol protein complex, with said phytosterol protein complex containing an amount of protein equal to between about 20% and 90% by weight of said phytosterol protein complex and an amount of a phytosterol equal to between about 5% and about 80% by weight of said phytosterol protein complex; and, b) feeding said phytosterol protein complex to the human at least once a day, so that the human receives at least 0.1 grams of phytosterol per day.

15. A method for forming a phytosterol protein complex which is easily absorbed by a human, wherein said method comprises:

mixing an amount of protein with an amount of phytosterol solubilized in an edible oil, wherein said phytosterol is present in said phytosterol protein complex in an amount equal to between about 5% and about 80% by weight of said phytosterol protein complex.

16. A method for forming a food product which delivers an amount of phytosterols which are readily bioavailable, wherein said method comprises:

a) mixing an amount of protein with an amount of phytosterol to form a phytosterol protein complex, wherein said phytosterol is present in said phytosterol protein complex in an amount equal to between about 5% and about 80% by weight of said phytosterol protein complex; and b) substituting in a 1:1 by weight ratio said phytosterol protein complex for any protein ingredient found in said food product.

17. The method of claim 16 wherein said protein is an amount of a defatted whole egg.

18. The method of claim 16 wherein said phytosterol protein complex is substituted for an egg product.

19. The method of claim 16 wherein said food product contains an amount of said phytosterol equal to at least 0.1 grams of said phytosterol per serving of said food product.

20. A food product for lowering serum cholesterol and low density lipoproteins in humans wherein said food product contains an amount of phytosterol protein complex, with said phytosterol protein complex comprised of:

a) an amount of said phytosterols equal to between about 5% and about 80% by weight of said phytosterol protein complex; and b) an amount of protein equal to between about 20% and 90% by weight of said phytosterol protein complex, with said phytosterol protein complex used in place of an egg product.

21. A method for forming a food product which delivers an amount of phytosterols which are readily bioavailable, wherein said method comprises:

a) mixing an amount of protein with an amount of phytosterol to form a phytosterol protein complex, wherein said phytosterol is present in said phytosterol protein complex in an amount equal to between about 5% and about 80% by weight of said phytosterol protein complex; and b) adding said phytosterol protein complex to said food product prior to consumption of said food product.

22. A phytosterol protein complex for increasing the bioavailability of a phytosterol constituent so as to deliver said phytosterol constituent to a human, wherein said phytosterol protein complex is comprised of:

a) an amount of said phytosterol equal to between about 5% and about 80% by weight of said phytosterol protein complex;

b) an amount of whole egg protein equal to between about 20% and 90% by weight of said phytosterol protein complex; and c) an amount of edible oil equal to between about 5% and 20% by weight of said phytosterol protein complex.

23. A phytosterol protein complex for increasing the bioavailability of a phytosterol constituent so as to deliver said phytosterol constituent to a human, wherein said phytosterol protein complex is in powder form and comprised of:

a) an amount of said phytosterol equal to between about 5% and about 80% by weight of said phytosterol protein complex;

b) an amount of protein equal to between about 20% and 90% by weight of said phytosterol protein complex; and c) an amount of edible oil equal to between about 5% and 20% by weight of said phytosterol protein complex.

24. A phytosterol protein complex for increasing the bioavailability of a phytosterol constituent so as to deliver said phytosterol constituent to a human, wherein said phytosterol protein complex is comprised of:

a) an amount of said phytosterol equal to between about 5% and about 80% by weight of said phytosterol protein complex;

b) an amount of protein equal to between about 70% and 85% by weight of said phytosterol protein complex; and c) an amount of edible oil equal to between about 5% and 20% by weight of said phytosterol protein complex.

* * * * *